US006965557B2

(12) United States Patent
Kim

(10) Patent No.: US 6,965,557 B2
(45) Date of Patent: Nov. 15, 2005

(54) INTERLEAVER MEMORY ACCESS APPARATUS AND METHOD OF CDMA SYSTEM

(75) Inventor: Dae Sik Kim, Kunpo (KR)

(73) Assignee: LG Electronics Inc., Seoul (KR)

( * ) Notice: Subject to any disclaimer, the term of this patent is extended or adjusted under 35 U.S.C. 154(b) by 937 days.

(21) Appl. No.: 09/801,637

(22) Filed: Mar. 9, 2001

(65) Prior Publication Data

US 2001/0021169 A1    Sep. 13, 2001

(30) Foreign Application Priority Data

Mar. 11, 2000  (KR) .............................. 2000-12257

(51) Int. Cl.⁷ ............................................ H04J 11/00
(52) U.S. Cl. ...................... 370/209; 370/335; 370/342; 370/441; 375/146
(58) Field of Search .................. 370/209, 335, 370/342, 441; 375/140, 146

(56) References Cited

U.S. PATENT DOCUMENTS 5,515,396 A * 5/1996 Dalekotzin .................. 375/142

| 6,304,581 B1 * | 10/2001 | Chen et al. .................. 370/479 |
| 6,396,822 B1 * | 5/2002 | Sun et al. .................... 370/335 |
| 6,421,333 B1 * | 7/2002 | Jalali .......................... 370/342 |
| 6,466,564 B1 * | 10/2002 | Rakib et al. ................ 370/342 |
| 6,567,389 B1 * | 5/2003 | Honkasalo et al. ......... 370/342 |

FOREIGN PATENT DOCUMENTS

JP    11-017559    1/1999
JP    11-122217    4/1999

* cited by examiner

*Primary Examiner*—Ricky Ngo
*Assistant Examiner*—Nittaya Juntima
(74) *Attorney, Agent, or Firm*—Fleshner & Kim, LLP

(57) ABSTRACT

An interleaver memory access apparatus of a CDMA system including an interleaver memory for storing code symbols to be transmitted; a shift register unit for simultaneously receiving 18 bit code symbols from the interleaver memory and outputting the 18 bit code symbols in three sets of 6 bit code symbols; an index decoding unit for decoding the 6 bit code symbols outputted from the shift register unit and generates a Walsh bit index; an address generator and control logic for controlling an access operation of the interleaver memory and the input and output operation of the shift register unit and the index coding unit; and an orthogonal modulator for outputting 64 bit Walsh codes based on the Walsh bit index outputted from the index decoding unit.

15 Claims, 9 Drawing Sheets

FIG. 2
BACKGROUND ART

| ROW | | | | | | | | | | | | | | | | | | |
|---|---|---|---|---|---|---|---|---|---|---|---|---|---|---|---|---|---|---|
| 1 | 33 | 65 | 97 | 129 | 161 | 193 | 225 | 257 | 289 | 321 | 353 | 385 | 417 | 449 | 481 | 513 | 545 |
| 2 | 34 | 66 | 98 | 130 | 162 | 194 | 226 | 258 | 290 | 322 | 354 | 356 | 418 | 450 | 482 | 514 | 546 |
| 3 | 35 | 67 | · | · | · | · | · | · | · | · | · | · | · | · | · | 515 | 547 |
| 4 | 36 | · | 100 | · | · | · | · | · | · | · | · | · | · | · | · | 516 | 548 |
| 5 | 37 | · | · | 132 | · | · | · | · | · | · | · | · | · | · | · | 517 | 549 |
| 6 | 38 | · | · | · | 166 | · | · | · | · | · | · | · | · | · | · | 518 | 550 |
| 7 | 39 | · | · | · | · | 199 | · | · | · | · | · | · | · | · | · | 519 | 551 |
| 8 | 40 | · | · | · | · | · | 232 | · | · | · | · | · | · | · | · | 520 | 552 |
| 9 | 41 | · | · | · | · | · | · | 265 | · | · | · | · | · | · | · | 521 | 553 |
| 10 | 42 | · | · | · | · | · | · | · | 298 | · | · | · | · | · | · | 522 | 554 |
| 11 | 43 | · | · | · | · | · | · | · | · | 331 | · | · | · | · | · | 523 | 555 |
| 12 | 44 | · | · | · | · | · | · | · | · | · | 364 | · | · | · | · | 524 | 556 |
| 13 | 45 | · | · | · | · | · | · | · | · | · | · | 397 | · | · | · | 525 | 557 |
| 14 | 46 | · | · | · | · | · | · | · | · | · | · | · | 430 | · | · | 526 | 558 |
| 15 | 47 | · | · | · | · | · | · | · | · | · | · | · | · | 463 | · | 527 | 559 |
| 16 | 48 | · | · | · | · | · | · | · | · | · | · | · | · | · | 496 | 528 | 560 |
| 17 | 49 | 81 | · | · | · | · | · | · | · | · | · | · | · | · | · | 529 | 561 |
| 18 | 50 | · | 114 | · | · | · | · | · | · | · | · | · | · | · | · | 530 | 562 |
| 19 | 51 | · | · | 147 | · | · | · | · | · | · | · | · | · | · | · | 531 | 563 |
| 20 | 52 | · | · | · | 180 | · | · | · | · | · | · | · | · | · | · | 532 | 564 |
| 21 | 53 | · | · | · | · | 213 | · | · | · | · | · | · | · | · | · | 533 | 565 |
| 22 | 54 | · | · | · | · | · | 246 | · | · | · | · | · | · | · | · | 534 | 566 |
| 23 | 55 | · | · | · | · | · | · | 279 | · | · | · | · | · | · | · | 535 | 567 |
| 24 | 56 | · | · | · | · | · | · | · | 312 | · | · | · | · | · | · | 536 | 568 |
| 25 | 57 | · | · | · | · | · | · | · | · | 345 | · | · | · | · | · | 537 | 569 |
| 26 | 58 | · | · | · | · | · | · | · | · | · | 378 | · | · | · | · | 538 | 570 |
| 27 | 59 | · | · | · | · | · | · | · | · | · | · | 411 | · | · | · | 539 | 571 |
| 28 | 60 | · | · | · | · | · | · | · | · | · | · | · | 444 | · | · | 540 | 572 |
| 29 | 61 | · | · | · | · | · | · | · | · | · | · | · | · | 477 | · | 541 | 573 |
| 30 | 62 | · | · | · | · | · | · | · | · | · | · | · | · | · | 510 | 542 | 574 |
| 31 | 63 | 95 | 127 | 159 | 191 | 223 | 255 | 287 | 329 | 351 | 383 | 415 | 447 | 479 | 541 | 543 | 575 |
| 32 | 64 | 96 | 128 | 160 | 192 | 224 | 256 | 288 | 320 | 352 | 384 | 416 | 448 | 480 | 542 | 544 | 576 |

COLUMN

FIG. 3
BACKGROUND ART

FULL RATE

| | | | | | | | |
|---|---|---|---|---|---|---|---|
| 1 | 33 | . | . | . | . | 513 | 545 |
| 2 | 34 | . | . | . | . | 514 | 546 |
| . | . | . | . | . | . | . | . |
| . | . | . | . | . | . | . | . |
| . | . | . | . | . | . | . | . |
| 31 | 63 | . | . | . | . | 543 | 575 |
| 32 | 64 | . | . | . | . | 544 | 576 |

HALF RATE (ONE TIMES REPEATION)

| | | | | | | | |
|---|---|---|---|---|---|---|---|
| 1 | 17 | . | . | . | . | 257 | 273 |
| 1 | 17 | . | . | . | . | 257 | 273 |
| . | . | . | . | . | . | . | . |
| . | . | . | . | . | . | . | . |
| . | . | . | . | . | . | . | . |
| 16 | 32 | . | . | . | . | 272 | 288 |
| 16 | 32 | . | . | . | . | 272 | 288 |

QUARTER RATE (3 TIMES REPEATION)

| | | | | | | | |
|---|---|---|---|---|---|---|---|
| 1 | 9 | . | . | . | . | 129 | 137 |
| 1 | 9 | . | . | . | . | 129 | 137 |
| 1 | 9 | . | . | . | . | 129 | 137 |
| 1 | 9 | . | . | . | . | 129 | 137 |
| . | . | . | . | . | . | . | . |
| . | . | . | . | . | . | . | . |
| 8 | 16 | . | . | . | . | 136 | 144 |
| 8 | 16 | . | . | . | . | 136 | 144 |

EIGHT RATE (7 TIMES REPEATION)

| | | | | | | | |
|---|---|---|---|---|---|---|---|
| 1 | 5 | . | . | . | . | 65 | 69 |
| 1 | 5 | . | . | . | . | 65 | 69 |
| . | . | . | . | . | . | . | . |
| . | . | . | . | . | . | . | . |
| . | . | . | . | . | . | . | . |
| 4 | 8 | . | . | . | . | 68 | 72 |
| 4 | 8 | . | . | . | . | 68 | 72 |

ROW →

| 1 | 17 | 33 | 49 | 65 | 81 | 97 | 113 | 129 | 145 | 161 | 177 |
|---|---|---|---|---|---|---|---|---|---|---|---|
| 2 | 18 | 34 | 50 | 66 | 82 | 98 | 114 | 130 | 146 | 162 | 178 |
| 3 | 19 | 35 | 51 | 67 | 83 | 99 | 115 | 131 | 147 | 163 | 179 |
| 4 | 20 | 36 | 52 | 68 | 84 | 100 | 116 | 132 | 148 | 164 | 180 |
| 5 | 21 | 37 | 53 | 69 | 85 | 101 | 117 | 133 | 149 | 165 | 181 |
| 6 | 22 | 38 | 54 | 70 | 86 | 102 | 118 | 134 | 150 | 166 | 182 |
| 7 | 23 | 39 | 55 | 71 | 87 | 103 | 119 | 135 | 151 | 167 | 183 |
| 8 | 24 | 40 | 56 | 72 | 88 | 104 | 120 | 136 | 152 | 168 | 184 |
| 9 | 25 | 41 | 57 | 73 | 89 | 105 | 121 | 137 | 153 | 169 | 185 |
| 10 | 26 | 42 | 58 | 74 | 90 | 106 | 122 | 138 | 154 | 170 | 186 |
| 11 | 27 | 43 | 59 | 75 | 91 | 107 | 123 | 139 | 155 | 171 | 187 |
| 12 | 28 | 44 | 60 | 76 | 92 | 108 | 124 | 140 | 156 | 172 | 188 |
| 13 | 29 | 45 | 61 | 77 | 93 | 109 | 125 | 141 | 157 | 173 | 189 |
| 14 | 30 | 46 | 62 | 78 | 94 | 110 | 126 | 142 | 158 | 174 | 190 |
| 15 | 31 | 47 | 63 | 79 | 95 | 111 | 127 | 143 | 159 | 175 | 191 |
| 16 | 32 | 48 | 64 | 80 | 96 | 112 | 128 | 144 | 160 | 176 | 192 |

COLUMN

FIG. 5
BACKGROUND ART

| ROW ADDRESS | 1 | | | | | | | | | | | | 2 | | | | | | | | | | | |
|---|---|---|---|---|---|---|---|---|---|---|---|---|---|---|---|---|---|---|---|---|---|---|---|---|
| COLUMN ADDRESS | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| OUTPUT DATA | 1 | 17 | 33 | 49 | 65 | 81 | 97 | 113 | 129 | 145 | 161 | 177 | 2 | 18 | 34 | 50 | 66 | 82 | 98 | 114 | 130 | 146 | 162 | 178 |
| ROW ADDRESS | 3 | | | | | | | | | | | | 4 | | | | | | | | | | | |
| COLUMN ADDRESS | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| OUTPUT DATA | 3 | 19 | 35 | 51 | 67 | 83 | 99 | 115 | 131 | 147 | 163 | 179 | 4 | 20 | 36 | 52 | 68 | 84 | 100 | 116 | 132 | 148 | 164 | 180 |
| ROW ADDRESS | 5 | | | | | | | | | | | | 6 | | | | | | | | | | | |
| COLUMN ADDRESS | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| OUTPUT DATA | 5 | 21 | 37 | 53 | 69 | 85 | 101 | 117 | 148 | 133 | 165 | 181 | 6 | 22 | 38 | 54 | 70 | 86 | 102 | 118 | 134 | 150 | 166 | 182 |
| ROW ADDRESS | 7 | | | | | | | | | | | | 8 | | | | | | | | | | | |
| COLUMN ADDRESS | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| OUTPUT DATA | 7 | 23 | 39 | 55 | 71 | 87 | 103 | 119 | 135 | 151 | 167 | 183 | 8 | 24 | 40 | 56 | 72 | 88 | 104 | 120 | 136 | 152 | 168 | 184 |
| ROW ADDRESS | 9 | | | | | | | | | | | | 10 | | | | | | | | | | | |
| COLUMN ADDRESS | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| OUTPUT DATA | 9 | 25 | 41 | 57 | 73 | 89 | 105 | 121 | 137 | 153 | 169 | 185 | 10 | 26 | 42 | 58 | 74 | 90 | 106 | 122 | 138 | 154 | 170 | 186 |
| ROW ADDRESS | 11 | | | | | | | | | | | | 12 | | | | | | | | | | | |
| COLUMN ADDRESS | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| OUTPUT DATA | 11 | 27 | 43 | 59 | 75 | 91 | 107 | 123 | 139 | 155 | 171 | 187 | 12 | 28 | 44 | 60 | 76 | 92 | 108 | 124 | 140 | 156 | 172 | 188 |
| ROW ADDRESS | 13 | | | | | | | | | | | | 14 | | | | | | | | | | | |
| COLUMN ADDRESS | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| OUTPUT DATA | 13 | 29 | 45 | 61 | 77 | 93 | 109 | 125 | 141 | 157 | 173 | 189 | 14 | 30 | 46 | 62 | 78 | 94 | 110 | 126 | 142 | 158 | 174 | 190 |
| ROW ADDRESS | 15 | | | | | | | | | | | | 16 | | | | | | | | | | | |
| COLUMN ADDRESS | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| OUTPUT DATA | 15 | 31 | 47 | 63 | 79 | 95 | 111 | 127 | 143 | 159 | 175 | 191 | 16 | 32 | 48 | 64 | 80 | 96 | 112 | 128 | 144 | 160 | 176 | 192 |

FIG. 7

| ROW ADDRESS | | OUTPUT DATA | | | | | | | | | | | | |
|---|---|---|---|---|---|---|---|---|---|---|---|---|---|---|
| 1 | | 1 | 17 | 33 | 49 | 65 | 81 | 97 | 113 | 129 | 145 | 161 | 177 | |
| | 2 | | 2 | 18 | 34 | 50 | 66 | 82 | 98 | 114 | 130 | 146 | 162 | 178 |
| 3 | | 3 | 19 | 35 | 51 | 67 | 83 | 99 | 115 | 131 | 147 | 163 | 179 | |
| | 4 | | 4 | 20 | 36 | 52 | 68 | 84 | 100 | 116 | 132 | 148 | 164 | 180 |
| 5 | | 5 | 21 | 37 | 53 | 69 | 85 | 101 | 117 | 133 | 149 | 165 | 181 | |
| | 6 | | 6 | 22 | 38 | 54 | 70 | 86 | 102 | 118 | 134 | 150 | 166 | 182 |
| 7 | | 7 | 23 | 39 | 55 | 71 | 87 | 103 | 119 | 135 | 151 | 167 | 183 | |
| | 8 | | 8 | 24 | 40 | 56 | 72 | 88 | 104 | 120 | 136 | 152 | 168 | 184 |
| 9 | | 9 | 25 | 41 | 57 | 73 | 89 | 105 | 121 | 137 | 153 | 169 | 185 | |
| | 10 | | 10 | 26 | 42 | 58 | 74 | 90 | 106 | 122 | 138 | 154 | 170 | 186 |
| 11 | | 11 | 27 | 43 | 59 | 75 | 91 | 107 | 123 | 139 | 155 | 171 | 187 | |
| | 12 | | 12 | 28 | 44 | 60 | 76 | 92 | 108 | 124 | 140 | 156 | 172 | 188 |
| 13 | | 13 | 29 | 45 | 61 | 77 | 93 | 109 | 125 | 141 | 157 | 173 | 189 | |
| | 14 | | 14 | 30 | 46 | 62 | 78 | 94 | 110 | 126 | 142 | 158 | 174 | 190 |
| 15 | | 15 | 31 | 47 | 63 | 79 | 95 | 111 | 127 | 143 | 159 | 175 | 191 | |
| | 16 | | 16 | 32 | 48 | 64 | 80 | 96 | 112 | 128 | 144 | 160 | 176 | 192 |

FIG. 8

| ROW → | | | | | | | | | | | |
|---|---|---|---|---|---|---|---|---|---|---|---|
| | 1 | 9 | 17 | 25 | 33 | 41 | 49 | 57 | 65 | 73 | 81 | 89 |
| | 1 | 9 | 17 | 25 | 33 | 41 | 49 | 57 | 65 | 73 | 81 | 89 |
| | 2 | 10 | 18 | 26 | 34 | 42 | 50 | 58 | 66 | 74 | 82 | 90 |
| | 2 | 10 | 18 | 26 | 34 | 42 | 50 | 58 | 66 | 74 | 82 | 90 |
| | 3 | 11 | 19 | 27 | 35 | 43 | 51 | 59 | 67 | 75 | 83 | 91 |
| | 3 | 11 | 19 | 27 | 35 | 43 | 51 | 59 | 67 | 75 | 83 | 91 |
| | 4 | 12 | 20 | 28 | 36 | 44 | 52 | 60 | 68 | 76 | 84 | 92 |
| | 4 | 12 | 20 | 28 | 36 | 44 | 52 | 60 | 68 | 76 | 84 | 92 |
| | 5 | 13 | 21 | 29 | 37 | 45 | 53 | 61 | 69 | 77 | 85 | 93 |
| | 5 | 13 | 21 | 29 | 37 | 45 | 53 | 61 | 69 | 77 | 85 | 93 |
| | 6 | 14 | 22 | 30 | 38 | 46 | 54 | 62 | 70 | 78 | 86 | 94 |
| | 6 | 14 | 22 | 30 | 38 | 46 | 54 | 62 | 70 | 78 | 86 | 94 |
| | 7 | 15 | 23 | 31 | 39 | 47 | 55 | 63 | 71 | 79 | 87 | 95 |
| | 7 | 15 | 23 | 31 | 39 | 47 | 55 | 63 | 71 | 79 | 87 | 95 |
| | 8 | 16 | 24 | 32 | 40 | 48 | 56 | 64 | 72 | 80 | 88 | 96 |
| | 8 | 16 | 24 | 32 | 40 | 48 | 56 | 64 | 72 | 80 | 88 | 96 |

REPEATED DATA (left) — VAILD DATA (right)

COLUMN

FIG. 9

| ROW ADDRESS | 1 | 2 |
|---|---|---|
| OUTPUT DATA | 1 9 17 25 33 41 49 57 65 73 81 89 | X X X X X X X X X X X X |
| ROW ADDRESS | 3 | 4 |
| OUTPUT DATA | 2 10 18 26 34 42 50 58 66 74 82 90 | X X X X X X X X X X X X |
| ROW ADDRESS | 5 | 6 |
| OUTPUT DATA | 3 11 19 27 35 43 51 59 67 75 83 91 | X X X X X X X X X X X X |
| ROW ADDRESS | 7 | 8 |
| OUTPUT DATA | 4 12 20 28 36 44 52 60 68 76 84 92 | X X X X X X X X X X X X |
| ROW ADDRESS | 9 | 10 |
| OUTPUT DATA | 5 13 21 29 37 45 53 61 69 77 85 93 | X X X X X X X X X X X X |
| ROW ADDRESS | 11 | 12 |
| OUTPUT DATA | 6 14 22 30 38 46 54 62 70 78 86 94 | X X X X X X X X X X X X |
| ROW ADDRESS | 13 | 14 |
| OUTPUT DATA | 7 15 23 31 39 47 55 63 71 79 87 95 | X X X X X X X X X X X X |
| ROW ADDRESS | 15 | 16 |
| OUTPUT DATA | 8 16 24 32 40 48 56 64 72 80 88 96 | X X X X X X X X X X X X |

INTERLEAVER MEMORY ACCESS APPARATUS AND METHOD OF CDMA SYSTEM

BACKGROUND OF THE INVENTION

1. Field of the Invention

The present invention relates to a CDMA system, and more particularly to an interleaver memory access apparatus and method of a CDMA system.

2. Description of the Background Art

FIG. 1 is a schematic block diagram of a general CDMA system in accordance with a conventional art. As shown in the drawing, the conventional CDMA system includes a frame quality indicator 10 for attaching a frame quality indicator indicating a data rate to a source data, a trail bit attaching unit 20 for attaching a 8 bit encoder trail bit to an output of the frame quality indicator 10, a convolutional encoder 30 for receiving the data bit from the trail bit attaching unit 20 and generating three code symbols (a serial data) per each data bit, a code symbol repeating unit 40 for repeating a symbol for the convolutional encoder 30 to make the same data size as the full rate, an interleaver memory 50 for storing the code symbols outputted from the code symbol repeating unit 40 according to a row and a column addresses outputted from an address generator 60, an orthogonal modulator 70 for receiving the code symbols from the interleaver memory 50, generates one Walsh index for 6 code symbols and outputs 64 Walsh codes, and a radio frequency processor 80 for spread-modulating the 64 Walsh chips outputted from the orthogonal modulator 70 and transmits a radio frequency signal.

The operation of the CDMA system constructed as described above will now be explained. For explanation's sake, it is assumed that the data rate is 4800 bps.

When a source data, an analog voice signal, is inputted to the CDMA system, the inputted source data is PCM-modulated and inputted through a VOCODER (not shown) to the frame quality indicator (FQI) 10.

Then, the frame quality indicator 10 attaches a predetermined bit of frame quality indicator indicating 4800 bps to the inputted source data and outputs a 4.4 kbps data bit. The trail bit attaching unit 20 attaches 8 bit of encoder trail bit to the 4.4 kbps data bit and outputs a 4.8 kbps data bit.

The convolutional encoder 30 generates three code symbols for each data bit outputted from the trail bit attaching unit 20 and outputs a 14.4 ksps code symbol.

The code symbol repeating unit 40 repeatedly outputs by one time the code symbols inputted from the convolutional encoder 30 and generates a 28.8 ksps code symbol, to make the same data size as that of the full rate (9600 bps).

In case that the data rate is 2400 bps, the code symbol repeating unit 40 repeats 3 times of code symbols. In case that the data rate is 1200 bps, the code symbol repeating unit 40 repeats 7 times of code symbols. Thus, the rate of the code symbols outputted from the code symbol repeating unit 40 has the same data size as that of the full rate.

As shown in FIG. 2, the interleaver memory 50 includes 32 row and 18 columns and writes and reads the code symbols outputted from the code symbol repeating unit 40 according to the row and the column address outputted from the address generator 60.

The orthogonal modulator 70 decodes the code symbols, which are inputted from the interleaver memory 50, by six ones to generate one Walsh index, and selectively outputs one of the 64 Walsh codes by using the generated Walsh index. Therefore, the ratio frequency processor 80 spread-modulates the 4.8 Ksps Walsh chip outputted from the orthogonal modulator 70 and converts it to a radio frequency signal and transmits the converted radio frequency signal.

The access operation of the interleaver memory 50 will now be described in detail.

Generally, the CDMA system supports a variable data rate. Accordingly, the code symbol repeating unit 40 repeats the code symbols (the serial data) for the data rates except for the full rate (9600 bps), that is, a half rate (4800 bps), a quarter rate (2400 bps) and an eight rate (1200 bps), to process easily the data.

The CDMA system transmits a data through a radio interface. However, when a data is transmitted through the radio interface, a data loss (an error) may unexpectedly occur due to various noise. Thus, before modulating and transmitting of the code symbol, a data interleaving is performed to prevent a burst error.

In the conventional CDMA system, the data interleaving is implemented by the interleaver memory 50 and the address generator 60.

The interleaver memory 50 sequentially writes the code symbols outputted from the code symbol repeating unit 40 at the position of a normal interleaver memory map as shown in FIG. 2 according to the row and the column addresses outputted from the address generator 60. Consequently, 1~576 code symbols (one frame data) are written in the interleaver memory 50.

FIG. 3 illustrates an example of interleaver memory map for each data rate.

Once the data writing operation is completed, the reading operation of the interleaver memory 50 is performed according to the order determined in a CDMA mobile communication standard, that is, according to the order of the following row address in the normal interleaver memory map of FIG. 2.

Fullrate: 1 2 3 4 5 6 7 8 9 10 . . . 25 26 27 28 29 30 31 32

Halfrate: 1 3 2 4 5 7 6 8 9 11 . . . 25 27 26 28 29 31 30 32

Quarterrate: 1 5 2 6 3 7 4 8 . . . 25 29 26 30 27 31 28 32

Eight rate: 1 9 2 10 3 11 4 12 . . . 21 29 22 30 23 31 24 32

For example, on the assumption that the code symbols of the full rate are stored in the interleaver memory 50 in the form as shown in FIG. 4, the address generator 60 changes the column from 1~12 in a state that it has outputted one row address, so that the 12 code symbols are sequentially read from the interleaver memory 50.

Code symbols of other data rates also read according to the same raw address and the column address order as that of the full rate.

As described above, in the conventional CDMA system, the access (the reading and writing) operation of the interleaver memory is repeatedly performed by code symbols.

In this respect, however, in order to read and write the code symbols of one frame, the serial data, since the address (the row and the column) generation and the access operation of the interleaver memory should be performed so frequently, causing a disturbance to the rapid data processing and a low power consumption.

In addition, in the conventional CDMA system, the orthogonal modulator 70 receives 6 code symbols, the serial data to generate one Walsh index. However, in order to generate one Walsh index, the orthogonal modulator 70 should wait for 6 code symbols to be received from the interlever memory 50, causing a problem that the data processing time is increasingly extended.

Thus, the conventional CDMA system fails to cope suitably with the rapid data processing and the minimum power consumption required for the mobile communication system.

SUMMARY OF THE INVENTION

Therefore, an object of the present invention is to provide an access apparatus of an interleaver memory that is capable of reducing a power consumption and increasing a data access speed by improving the addressing and access operation of an interleaver memory, and its method.

Another object of the present invention is to provide an access apparatus of an interleaver memory that is capable of increasing a data processing rate by receiving 6 code symbols in parallel and generating one Walsh index, and its method.

To achieve these and other advantages and in accordance with the purpose of the present invention, as embodied and broadly described herein, there is provided an interleaver memory access apparatus of a CDMA system including: an interleaver memory for storing code symbols to be transmitted; a shift register unit for simultaneously receiving 18 bit code symbols from the interleaver memory and outputting it by 6 code symbols; an index decoding unit for decoding the 6 code symbols outputted from the shift register unit and generates a Walsh index; an address generator and control logic for controlling the access operation of the interleaver memory and the input and output operation of the shift register unit and the index coding unit; and an orthogonal modulator for outputting 64 Walsh codes on the basis of the Walsh index outputted from the index decoding unit.

To achieve the above objects, there is also provided an interleaver memory access method of a CDMA system including the steps of: storing code symbols to be transmitted in the interleaver memory; reading 1-row code symbols stored in the interleaver memory by using a row address signal and outputting them to the shift register unit; repeatedly accessing the first code symbols stored in the shift register unit according to the transfer rate of the code symbols; and decoding the 6 code symbols outputted from the shift register unit and generating one Walsh index.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 illustrates a normal interleaver memory map of FIG. 1 in accordance with the conventional art;

FIG. 3 illustrates an example of an interleaver memory map for each data rate in accordance with the conventional art;

FIG. 5 illustrates addressing in the interleaver memory of FIG. 4 and the corresponding data output values in accordance with the conventional art;

FIG. 7 illustrates addressing and corresponding data output values of the interleaver memory of FIG. 6 in accordance with the present invention;

FIG. 8 illustrates an interleaver memory map storing code symbols of a half rate of FIG. 6 in accordance with the present invention; and FIG. 9 illustrates addressing and corresponding data output values of the interleaver memory of FIG. 8 in accordance with the present invention.

DETAILED DESCRIPTION OF THE PREFERRED EMBODIMENTS

Reference will now be made in detail to the preferred embodiments of the present invention, examples of which are illustrated in the accompanying drawings.

Figure 6:
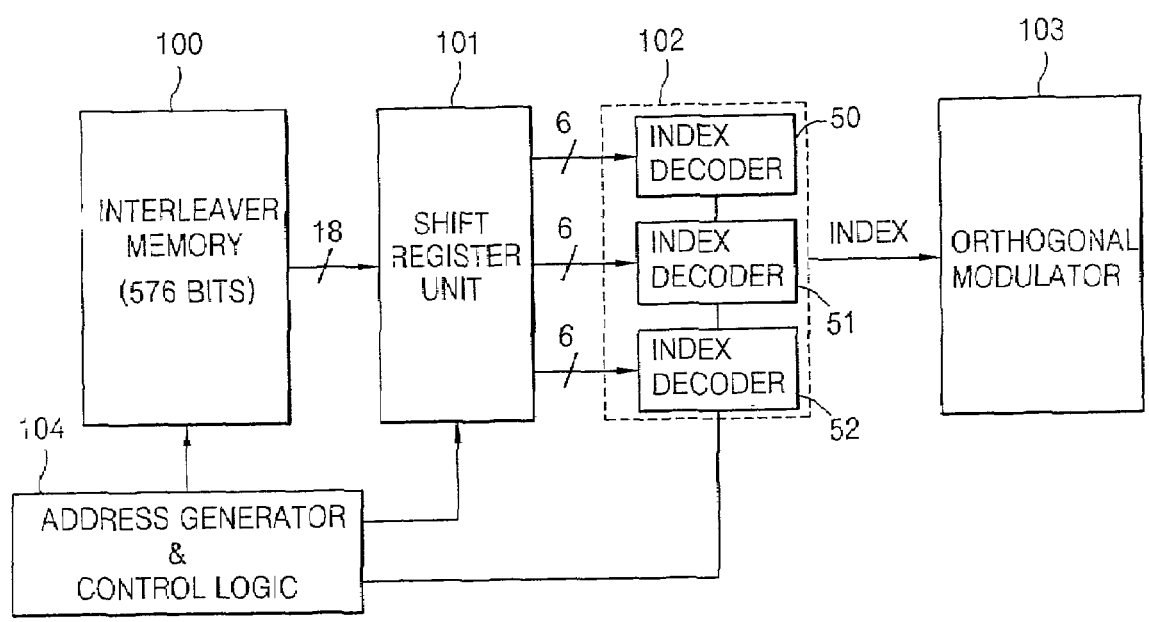
FIG. 6 is a schematic block diagram of an interleaver memory access apparatus of a CDMA system in accordance with the present invention.

FIG. 6 is a schematic block diagram of an interleaver memory access apparatus of a CDMA system in accordance with the present invention.

As shown in the drawing, the interleaver memory access apparatus of a CDMA system of the present invention includes an interleave memory 100, a shift register unit 101 for simultaneously receiving 18 bit code symbols from the interleaver memory and outputting it by 6 code symbols; an index decoding unit 102 for decoding the 6 code symbols outputted from the shift register unit and generates a Walsh index; an orthogonal modulator for outputting 64 Walsh codes on the basis of the Walsh index outputted from the index decoding unit; and an address generator and control logic for controlling the access operation of the interleaver memory and the input and output operation of the shift register unit and the index coding unit.

The interleaver memory 100 is constructed as a memory bank of the same size (576 bit) as that of the conventional art.

The shift register unit 101 includes two shift registers connected in series so that one shift register performs reading operation, the other one may perform writing operation. Each shift register is divided into three storing regions and sequentially outputs 6 code symbols according to a data select signal (DE) outputted from the address generator and control logic (104).

The index decoding unit 102 includes a first through a third index decoders 50~52 which sequentially receive the 6 code symbols from each register of the shift register unit 101 and generate one Walsh index. The first through the third index decoders 50~52 are activated according to an enable signal (EN) outputted from the address generator and control logic 104.

The orthogonal moduolator 103 generates only a Walsh code according to the Walsh index outputted from the index decoding unit 102, rather than generating both the Walsh index and the Walsh code as in the conventional art.

The operation of the interleaver memory access apparatus of the present invention constructed as described above will now be explained.

First, the access operation of the interleaver memory 100 is the same as that of the conventional art, except for the reading operation.

That is, in the present invention, when the reading operation of the interleaver memory is performed according to the order determined by the CDMA mobile communication standard, the column address is not used and only row address is used.

Therefore, whenever a row address is inputted by the address generator and control logic 104, 1-row data written in the interleaver memory 100, that is, 18 code symbols of FIG. 2 are simultaneously read.

Figure 1:
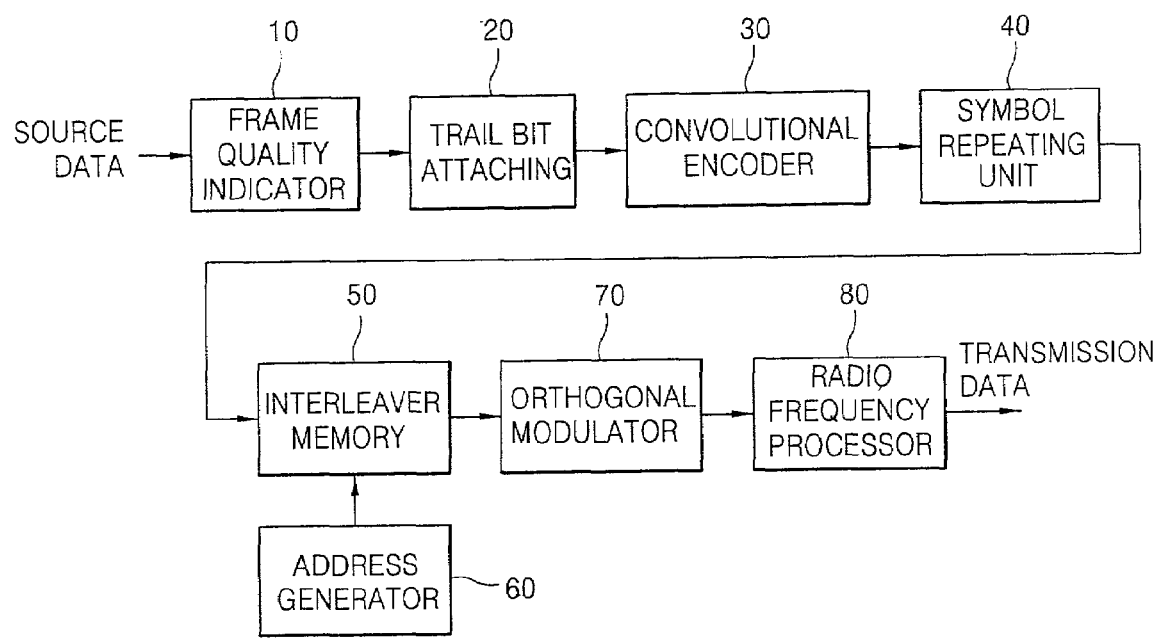
FIG. 1 is a schematic block diagram of a general CDMA system in accordance with a conventional art.
Figure 4:
FIG. 4 illustrates an example of an interleaver memory map storing code symbols of a full rate in accordance with the conventional art.

For example, on the assumption that the code symbols of the full rate are stored in the interleaver memory 100 in the form of FIG. 4, the interleaver memory 100 outputs 1-row code symbols by one time according to the row addresses (1, . . . , 16) sequentially inputted from the address generator and control logic 104. That is, the row address serves as a transmission signal of the symbol code.

Meanwhile, on the assumption that the code symbols of a half rate are stored in the interleaver memory 100 in the form as shown n FIG. 8, the interleaver memory 100 outputs 1-row code symbols by one time according to eh row addresses (1 3 5 7 9 11 13 15) inputted from the address generator and control logic 104. The code symbols stored in the even rows of the interleaver memory 100 are the code symbols which have been repeatedly stored in the symbol repeating unit of the conventional art, the same as the code symbols of the previous row, to facilitate data processing.

Accordingly, as shown in FIG. 9, the code symbols stored in the even row of the interleaver memory 100 are not read from the interleaver memory 100, the data select signal DS is outputted to repeatedly access the code symbols of the previous row which has been already transmitted to the shift register unit 101. This replaces the access operation of the code symbols stored in the even rows.

The first through the third index decoders 50~52 of the index decoding unit 102 are sequentially activated according to the enable signal EN outputted from the address generator and control logic 104, decode the 6 code symbols inputted from the shift register unit 101 and generate one Walsh index, respectively.

Accordingly, the orthogonal modulator 103 generates 64 Walsh codes according to the Walsh index outputted from the first through the thrid index decoders 50~52 and outputs them.

As so far described, according to the interleaver memory access apparatus and method of the CDMA system of the present invention, the interleaver memory performs reading operation by only using the row address. Consequently, a simple addressing is implemented for the memory access, so that the performance of the overall CDMA system as well as the data access speed can be enhanced.

In addition, since the code symbols of the previous row stored in the shift register are repeatedly accessed to be generated, rather than reading the repeated data stored in the interleaver memory. Consequently, the access number of the interleaver memory is considerably reduced, so that the power consumption is accordingly reduced for the memory access.

The present invention is also featured in that the Walsh index generation function, which is included in the orthogonal modulator of the conventional art, is separated therefrom, for which, instead, an index decoding unit is provided.

Moreover, since the 6 code symbols are simultaneously outputted from the shift register unit by using the one clock of enable signal, the index decoding unit does not wait until the 6 code symbols are inputted as in the conventional art and can quickly generate the Walsh index. Resultantly, the operation speed of the orthogonal modulator can be remarkably improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An interleaver memory access apparatus of a CDMA system comprising:
    an interleaver memory for storing code symbols to be transmitted;
    a shift register unit for simultaneously receiving 18 bit code symbols from the interleaver memory and outputting the 18 bit code symbols in three sets of 6 bit code symbols;
    an index decoding unit for decoding the 6 bit code symbols outputted from the shift register unit and generating a Walsh bit index;
    an address generator and control logic for controlling an access operation of the interleaver memory and an input and output operation of the shift register unit and the index coding unit; and
    an orthogonal modulator for outputting 64 bit Walsh codes based on the Walsh bit index outputted from the index decoding unit.

2. The apparatus of claim 1, wherein the interleaver memory simultaneously outputs a row of code symbols according to a row address outputted from the address generator and control logic.

3. The apparatus of claim 1, wherein the shift register unit includes two shift registers connected in series so that when one shift register performs a reading operation, the other shift register can perform a writing operation.

4. The apparatus of claim 3, wherein each shift register includes three storing regions.

5. The apparatus of claim 4, wherein each shift register simultaneously outputs 6 bit code symbols stored in each storing region according to a data select signal outputted from the address generator and control logic.

6. The apparatus of claim 1, wherein the index decoding unit includes first, second and third index decoders for sequentially receiving 6 bit code symbols from the shift register unit and generating a corresponding Walsh bit index, respectively.

7. The apparatus of claim 6, wherein the first, second and third index decoders are sequentially activated according to an enable signal outputted from the address generator and control logic.

8. The apparatus of claim 1, wherein the address generator and control logic repeatedly accesses the shift register if code symbols to be transmitted are not in a full rate.

9. The apparatus of claim 8, wherein the address generator and control logic accesses the shift register one time for a half rate, repeatedly accesses the shift register three times for a quarter rate, and repeatedly accesses the shift register seven times for an eighth rate.

10. An interleaver memory access method of a CDMA system comprising:
    storing code symbols to be transmitted in an interleaver memory;
    reading a row of code symbols stored in the interleaver memory using a row address signal and outputting the row of code symbols to a shift register unit;

repeatedly accessing the code symbols stored in the shift register unit according to a transfer rate of the code symbols; and decoding the code symbols outputted from the shift register unit and generating one Walsh index.

11. The method of claim 10, wherein the interleaver memory writes symbol codes according to row and column addresses and reads symbol codes according to a row address.

12. The method of claim 10, wherein the shift register unit includes two shift registers connected in series so that when one shift register performs a reading operation, the other shift register can perform a writing operation.

13. The apparatus of claim 10, wherein each shift register includes three storing regions, and each region stores six code symbols.

14. The apparatus of claim 10, wherein if the transfer rate of the code symbols is the full rate, the shift register is not repeatedly accessed.

15. The apparatus of claim 10, wherein the shift register is accessed once if the transfer rate is a half rate, repeatedly accessed three times for a quarter rate, and repeatedly accessed seven times for an eighth rate.

* * * * *